United States Patent [19]
Schierbeek et al.

[11] Patent Number: 5,659,423
[45] Date of Patent: Aug. 19, 1997

[54] MODULAR VARIABLE REFLECTANCE MIRROR ASSEMBLY

[75] Inventors: Kenneth L. Schierbeek, Zeeland; Kenneth Schofield; Niall R. Lynam, both of Holland, all of Mich.

[73] Assignee: Donnelly Corporation, Holland, Mich.

[21] Appl. No.: 316,047

[22] Filed: Sep. 30, 1994

[51] Int. Cl.$^6$ .............................. G02B 5/08; G02B 17/00
[52] U.S. Cl. .......................... 359/604; 359/602; 359/603
[58] Field of Search ........................ 359/38, 601–609, 359/613–614, 245, 249, 265–274; 356/121–123, 218; 250/201.8, 206.1, 206.2, 208.1, 214.1, 221, 214 AL, 214 B

[56] References Cited

U.S. PATENT DOCUMENTS

| | | | |
|---|---|---|---|
| 3,601,614 | 8/1971 | Platzer, Jr. | 250/214 AL |
| 3,680,951 | 8/1972 | Jordan et al. | 359/606 |
| 3,746,430 | 7/1973 | Brean et al. | 359/604 |
| 3,811,046 | 5/1974 | Levick | 250/206 |
| 3,862,798 | 1/1975 | Hopkins | 359/38 |
| 4,005,928 | 2/1977 | Kmetz et al. | 359/84 |
| 4,078,859 | 3/1978 | Sharett | 359/604 |
| 4,201,451 | 5/1980 | Jacob | 359/38 |
| 4,266,856 | 5/1981 | Wainwright | 359/606 |
| 4,281,898 | 8/1981 | Ochiai et al. | 359/606 |

(List continued on next page.)

FOREIGN PATENT DOCUMENTS

| | | |
|---|---|---|
| 0426503A1 | 5/1991 | European Pat. Off. . |
| 2133182 | 1/1973 | Germany . |
| 60-121141 | 6/1985 | Japan . |
| 60-212730 | 10/1985 | Japan . |
| 60-173922 | 11/1985 | Japan . |
| 1131236 | 10/1968 | United Kingdom . |
| 2029343 | 3/1980 | United Kingdom . |
| 2119087 | 11/1983 | United Kingdom . |
| 2156295 | 10/1985 | United Kingdom . |
| 94/19212 | 9/1994 | WIPO . |

*Primary Examiner*—Thong Nguyen
*Attorney, Agent, or Firm*—Van Dyke, Gardner, Linn & Burkhart, LLP

[57] ABSTRACT

A modular rearview mirror system includes a variable reflectance device having a reflectance surface, which reflects light incident the surface from a direction rearward of the vehicle. The variable reflectance device is responsive to a drive signal by dimming to a partial reflectance condition. A control for the reflectivity value of the variable reflectance device includes first and second light sensors and a circuit. The circuit is responsive to the light sensors to produce a drive signal as a function of the light levels to which the light sensors are exposed. The first and second light sensors are both aimed generally in a direction rearwardly of the vehicle. The first light sensor is aimed along a generally horizontal axis and the second light sensor is aimed along another axis that deviates from the horizontal axis. A preferable deviation between the axes is at least approximately 10 degrees, but not more than approximately 70 degrees. The light sensors may both be positioned behind the variable reflectance device within the mirror casing and may be aimed through the variable reflectance device and/or through a potion of the substrate thereof. The variable reflectance device is preferably an electrochromic mirror element but may also be a liquid crystal device, suspended particle device, or other known electro-optical device. The automatic rearview mirror system may be used as an exterior vehicle mirror, as a vehicle interior mirror, or as all three mirrors on a vehicle. The mirror system is particularly suited for use on automobiles, minivans, light trucks, small vans, and sport utility vehicles.

82 Claims, 4 Drawing Sheets

U.S. PATENT DOCUMENTS

| | | | |
|---|---|---|---|
| 4,529,873 | 7/1985 | Ballmer et al. | 250/201.1 |
| 4,572,619 | 2/1986 | Reininger et al. | 359/254 |
| 4,603,946 | 8/1986 | Kato et al. | 359/38 |
| 4,623,222 | 11/1986 | Itoh et al. | 359/38 |
| 4,632,509 | 12/1986 | Ohmi et al. | 359/38 |
| 4,655,549 | 4/1987 | Suzuki et al. | 359/38 |
| 4,669,825 | 6/1987 | Itoh et al. | 359/38 |
| 4,669,826 | 6/1987 | Itoh et al. | 359/604 |
| 4,671,615 | 6/1987 | Fukada et al. | 359/38 |
| 4,676,601 | 6/1987 | Itoh et al. | 359/38 |
| 4,690,508 | 9/1987 | Jacob | 359/38 |
| 4,697,883 | 10/1987 | Suzuki et al. | 359/604 |
| 4,721,364 | 1/1988 | Itoh et al. | 359/38 |
| 4,741,603 | 5/1988 | Miyagi et al. | 359/270 |
| 4,793,690 | 12/1988 | Gahan et al. | 359/604 |
| 4,799,768 | 1/1989 | Gahan | 359/604 |
| 4,886,960 | 12/1989 | Molyneux et al. | 250/206 |
| 4,896,030 | 1/1990 | Miyaji | 250/206 |
| 4,917,477 | 4/1990 | Bechtel et al. | 359/267 |
| 4,948,242 | 8/1990 | Desmond et al. | 359/602 |
| 5,012,593 | 5/1991 | Okada et al. | 359/509 |
| 5,081,346 | 1/1992 | Narabu et al. | 250/208.1 |
| 5,193,029 | 3/1993 | Schofield et al. | 359/265 |
| 5,322,996 | 6/1994 | Black et al. | 250/214 AL |
| 5,397,888 | 3/1995 | Muramatsu | 359/275 |
| 5,510,609 | 4/1996 | Ackermann | 250/201.1 |

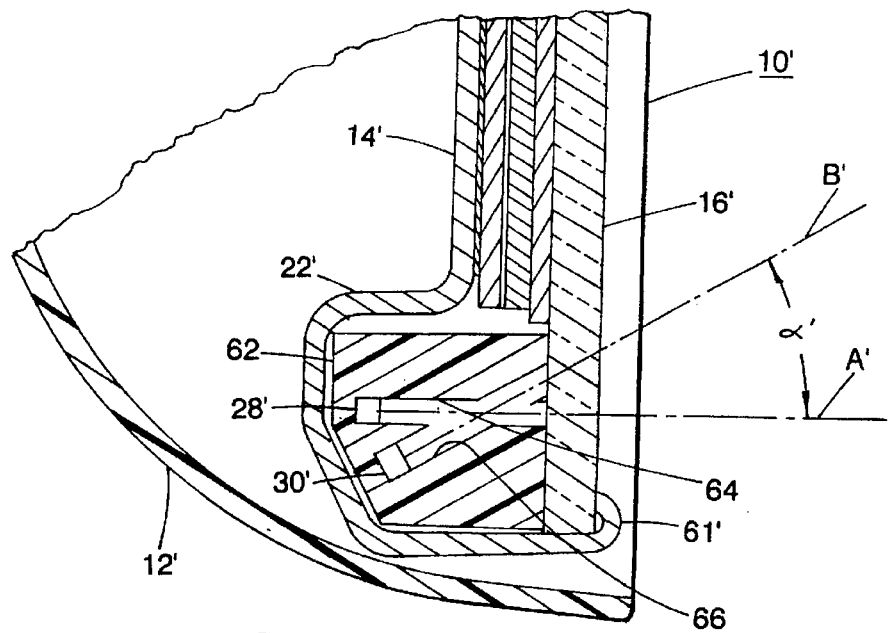
FIG. 4
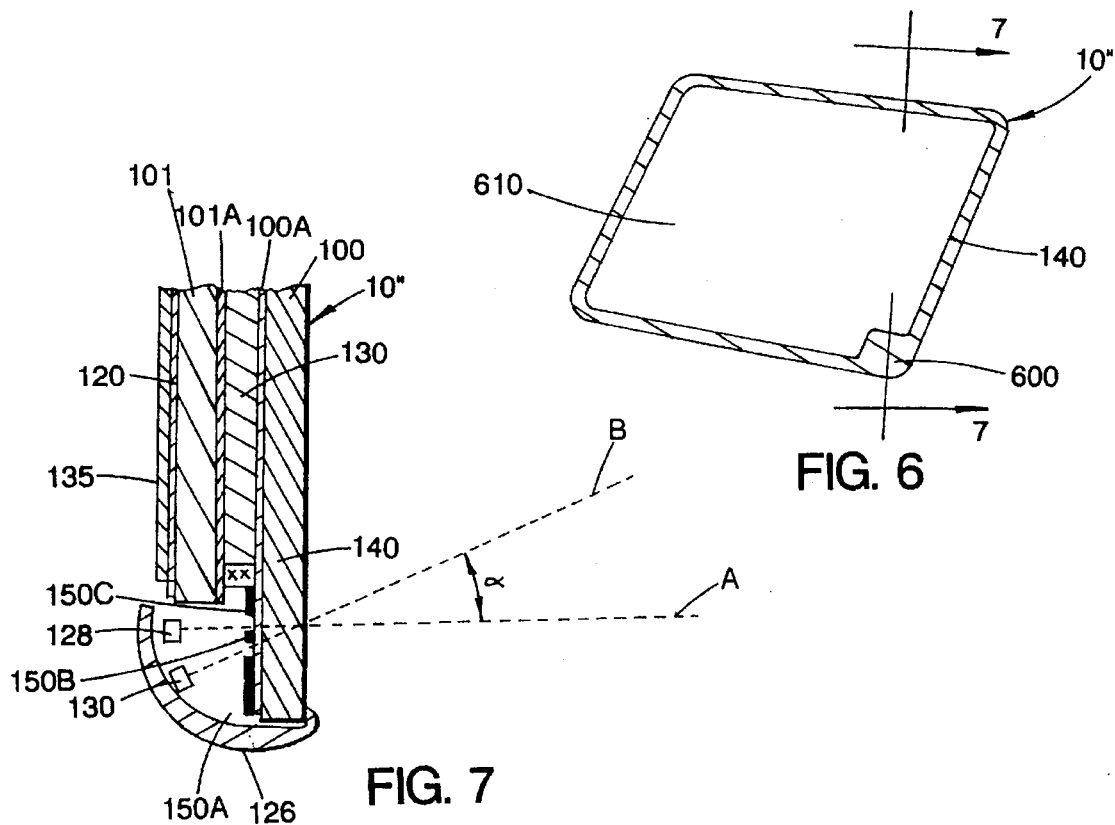
FIG. 6
FIG. 7 ing surface, and one aimed in a direction other than rearward of the vehicle, typically forwardly, in order to detect general lighting conditions. One such control is disclosed in com-
MODULAR VARIABLE REFLECTANCE MIRROR ASSEMBLY

BACKGROUND OF THE INVENTION

This invention relates generally to automatic rearview mirror systems for vehicles and, more particularly, to rearview mirror systems utilizing electrochromic mirrors. The invention is especially adapted for use with the exterior mirrors on a vehicle and is particularly suited for use on automobiles, minivans, light trucks, small vans, and sport utility vehicles.

Electrochromic mirror technology has facilitated the ability to control the reflectivity level of both the rearview mirror in the vehicle passenger compartment and the mirrors mounted on the exterior of the vehicle by dimming the mirrors to a partial reflectance level. The partial reflectance levels of the exterior mirrors are commonly controlled by the circuit that also establishes the partial reflectance level of the interior rearview mirror. The exterior mirrors are dimmed to partial reflectance levels that are either the same as, or in proportion to, the partial reflectance level of the interior mirror. Such conventional control of the exterior mirrors in tandem with the interior mirror is commonly referred to as slave control of the exterior mirrors.

One difficulty with such control of exterior mirrors is that a drive signal line must be run from the control, typically located in the housing of the interior mirror, to the exterior mirror. The drive signal line is typically routed to the exterior mirrors along with supply lines for providing vehicle battery voltage or ignition voltage to a mirror heater, provided in order to remove dew and ice from the exterior mirror, and to the motors used to mechanically position the mirror about vertical and horizontal axes. The electrochromic mirror element is generally operated in a voltage range of between about zero volts and about two volts while the voltages supplied to the other exterior mirror components range between approximately 12 and 16 volts DC. Such combination of disparate voltage levels increases the risk that the vehicle's battery voltage, ignition voltage, or a 12-volt supply may be inadvertently applied to the electrochromic mirror element, especially during repair or replacement of the exterior mirror, thus damaging or even destroying the electrochromic element. Another disadvantage of such conventional system is that special wiring must be placed within vehicles which have automatic exterior rearview mirrors. This increases the number of vehicle configurations, as well as parts inventories, and all but prohibits the addition of a stand-alone automatic rearview mirror system to the exterior of the vehicle as a field retrofit in the after-sale market.

Furthermore, such slaved control of the exterior mirror by the circuitry of the interior automatic electrochromic mirror may be economically and/or physically disadvantageous in some vehicles. For example, in vans, and their like, there may not exist an opportunity to mount an interior mirror with an unobstructed field of view rearward. Likewise, for some minivans, light trucks and for large Class 8 trucks, which are heavy trucks that are equipped on their driver-side and passenger-side with large exterior rearview mirrors, with a mirror reflector area typically greater than about 500 cm$^2$, it may be desirable, indeed may be necessary, to use electrochromic rearview mirrors on the driver-side or passenger-side, or both, only with either a conventional lower cost conventional prismatic mirror used within the interior cabin, or no interior mirror at all being within the interior cabin.

Controls for an automatic rearview mirror traditionally utilize two sensors, one aimed generally rearwardly of the vehicle, in order to detect glare incident the rearview reflecting surface, and one aimed in a direction other than rearward of the vehicle, typically forwardly, in order to detect general lighting conditions. One such control is disclosed in commonly assigned U.S. Pat. No. 4,886,960 issued to Keith Molyneux et al. for a CONTROL CIRCUIT FOR AN AUTOMATIC REARVIEW MIRROR. While such controls are suitable for use in automatic rearview mirrors positioned within the passenger compartment of the vehicle, difficulties are created by attempting to position such controls proximate the mirror element exterior the vehicle. Of primary difficulty is the positioning of the sensor that is directed other than rearward of the vehicle. In order to position a sensor to be aimed in a direction other than rearward of the vehicle, it would be necessary to provide a hole, or opening, or at least a non-opaque, light-transmitting window, in the exterior mirror housing through which the non-rearward facing sensor would be exposed to light. One difficulty with providing such separate opening or window is that the mirror is adjustable physically with respect to the housing. Therefore, either the control must be mounted separately from the mirror and interconnected with wiring, or separate leads must be run from the sensor to a control mounted to the mirror. Either way, the labor cost and complexity of the mirror is greatly increased. It would be disadvantageous to position the non-rearward facing sensor on a control moveable with the mirror because alignment between the sensor and the opening, or window, would be extremely difficult. Another difficulty with providing a separate opening, or window, in the mirror housing is that such opening, or window, exterior of the vehicle would have a tendency to become blocked with debris. In contrast with the surface of the exterior mirror, which is cleaned when it is perceived by the driver that the mirror is obstructed by debris, a separate opening, or window, in the mirror housing would not likely be cleared of debris in between washings of the vehicle. Further, any hole or opening in the mirror housing could be a potential port of entry for moisture from rain, carwashes, road splash, and the like, with a consequent propensity for deterioration, electrical malfunction, and/or damage to components within the housing.

Perhaps for these reasons, although it is known to use mirror control circuitry such as described in the Molyneux et al. '960 patent that involves two sensors in conjunction with exterior vehicular electrochromic mirrors, to date such two-sensor exterior electrochromic automatic rearview mirrors have not enjoyed commercial success, particularly when used as exterior mirrors on automobiles, minivans, light trucks, small vans, and sport utility vehicles where the mirror reflector areas are relatively small (within the range between above about 100 cm$^2$ to below about 500 cm$^2$) and where the mirror housings are correspondingly cramped.

SUMMARY OF THE INVENTION

The present invention provides a modular rearview mirror system, which is substantially self-contained and capable of use as either an exterior rearview mirror or an interior rearview mirror, or both. An automatic rearview mirror system according to the invention includes a variable reflectance device having a reflectance surface, which reflects light incident the surface from a direction rearward of the vehicle. The variable reflectance device is responsive to a drive signal by dimming to a partial reflectance condition. Such device preferably comprises an electrochromic mirror element. However, other variable reflectance devices such as liquid crystal devices and suspended particle devices, as commonly known in the electro-optical mirror art, can be used in the broader aspects of the invention. A control for controlling the reflectivity value of the variable reflectance device includes first and second light sensors in a circuit. The circuit is responsive to the light sensors to produce a drive signal as a function of the light levels to which the light sensors are exposed. The first and second light sensors are both aimed generally in a direction rearwardly of the vehicle. The first light sensor is aimed along a generally horizontal axis and the second light sensor is aimed along another axis that deviates from the horizontal axis. A preferable deviation between the axes is at least approximately 10 degrees but not more than approximately 70 degrees. However, a deviation up to about approximately 80 degrees is operable, and particularly when the photosensitive surface of the second light sensor is positioned less than about 1 cm inward within the cavity of the mirror housing such that its field of view rearward is not unduly restricted by shadowing from the outermost rim of the housing. Such deviation can be either a positive, or upward, deviation or can be a negative, or downward, deviation with respect to the generally horizontal axis of the first sensor.

The first and second light sensors advantageously are aimed in a direction that eliminates the requirement for a separate opening, or window, in the mirror housing. The light sensors may both be positioned behind the variable reflectance device within the mirror casing and may be aimed through the variable reflectance device and/or through a portion of the substrate thereof. Advantageously, the act of clearing debris from the outer surface, which is typically glass, of the mirror element will also clear debris away from the light sensors. In a preferred embodiment, the control circuit is responsive to the ratio of light levels to which the first and second light sensors are exposed. In this manner, the drive signal developed by the control circuit is relatively unaffected by any debris that is present on the mirror surface because the debris will attenuate light levels sensed by both of the light sensors to the same general extent. Furthermore, such control circuit enables the light sensors to be aimed through a variable light transmission layer of the variable reflectance device because the variable light transmission layer will equally attenuate light to which both of the light sensors are exposed. Alternatively, the light sensors may be aimed through a portion of the variable reflectance device in which the variable light transmission layer is eliminated or may be positioned so as to not be aimed through the variable reflectance device. Preferably, the second non-horizontal aimed sensor is positioned so as not to be behind the variable light transmission layer in order that it is not subject to partial attenuation when the variable light transmission layer is caused to dim.

These and other objects, advantages, and features of this invention will become apparent upon review of the following specification in conjunction with the drawings.

BRIEF DESCRIPTION OF THE DRAWINGS

FIG. 4 is an enlarged sectional view similar to FIG. 2 of an alternative light sensor arrangement, according to the invention;

FIG. 6 is a rear elevational view of an alternative automatic rearview mirror system, according to the invention; and FIG. 7 is a sectional view taken along the lines 7—7 in FIG. 6.

DESCRIPTION OF THE PREFERRED EMBODIMENT

Figure 1:
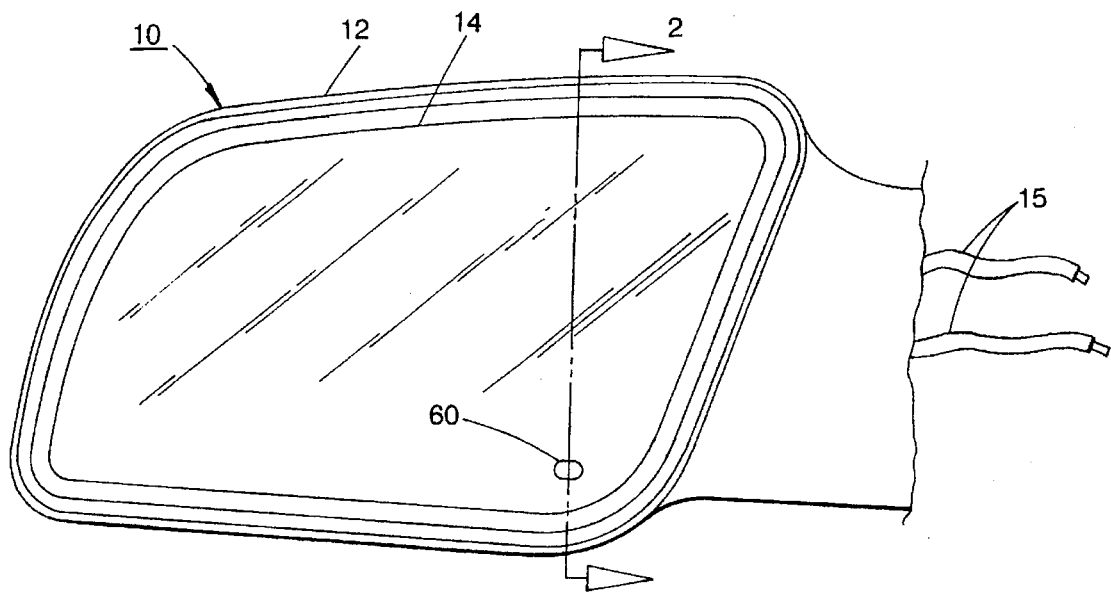
FIG. 1 is a rear elevational view, in relationship to vehicular movement, of an automatic rearview mirror system, according to the invention.
Figure 2:
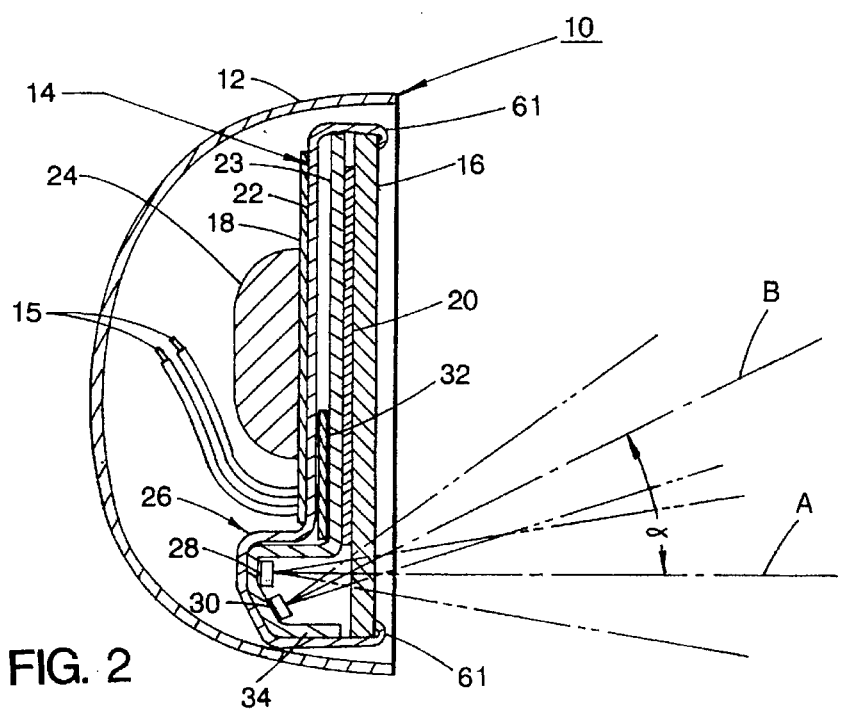
FIG. 2 is a sectional view taken along the lines 2—2 in FIG. 1.

Referring now specifically to the drawings, and the illustrative embodiments depicted therein, an automatic rearview mirror system 10 includes a casing, or housing, 12 attached to an exterior portion of a vehicle (not shown) and a variable reflectance assembly 14, which includes a variable reflectance device having a reflectance surface which reflects light incident from a direction rearward of the vehicle, mounted within casing 12 (FIGS. 1 and 2). In the illustrated embodiment, variable reflectance assembly 14 is an electrochromic mirror assembly. Electrochromic mirror assembly 14, which may be mounted to a retaining member, such as backplate 18, by an adhesive (not shown) includes an electrochromic mirror element 16. Such electrochromic mirror element may be either of the electrochemichromic type, such as that disclosed in U.S. Pat. No. 5,140,455 issued to Varaprasad et al. and commonly assigned with the present application, the disclosure of which is hereby incorporated herein by reference, or may be of the solid-state type, such as that disclosed in U.S. Pat. No. 4,712,879 issued to Niall R. Lynam et al., U.S. patent application Ser. No. 08/023,675 filed Feb. 22, 1993, by Varaprasad et al., now abandoned, U.S. patent application Ser. No. 08/193,557 filed Feb. 8, 1994, by Varaprasad et al., now abandoned, and U.S. patent application Ser. No. 08/238,521 filed Mar. 5, 1994, by Varaprasad et al., all commonly assigned with the present application and as disclosed in U.S. Pat. No. 4,671,619 issued to Kamimiori et al., the disclosures of which are hereby incorporated herein by reference. Such electrochromic mirror elements are continuously variable and exhibit multiple partial reflectance states as the voltage applied thereto is varied.

Electrochromic mirror assembly 14 further includes an encasement 22, which is secured to an electrically operated actuator 24 by backplate 18. Actuator 24, which secures mirror assembly 14 to casing 12, is a two-axis positioning device that adjusts the position of electrochromic mirror assembly 14 about vertical and horizontal axes, as is known in the art. In the illustrated embodiment, actuator 24 may be a Model No. H16-49-8001 (right-hand mirror) and Model No. H16-49-8051 (left-hand mirror) marketed by Matsuyama of Kawagoe City, Japan, or Model No. 540 marketed by Industrie Koot BV (IKU) of Montfoort, Netherlands. Actuator 24, which may be a memory actuator, is powered by a vehicle battery voltage, ignition voltage, or a 12-volt supply via a power line. If the mirror system is to be used as an exterior mirror, a heater pad 20 may be positioned against mirror element 16 in order to remove ice and dew from mirror element 16. Such heater structure may be of the type disclosed in commonly assigned U.S. patent application Ser. No. 07/971,676 filed Nov. 4, 1992, by Niall R. Lynam et al. for an ELECTROCHROMIC MIRROR FOR VEHICLES, now U.S. Pat. No. 5,446,576, the disclosure of which is hereby incorporated by reference. Also, an ultrasonic transducer, such as is conventionally known, can be included to remove raindrops from the outer surface of the electrochromic mirror element, such as is disclosed in U.S. Pat. No. 5,012,593 issued to Shoji Okada et al. for a DEVICE FOR REMOVING WATER DROPLETS. Alternatively, the outer surface of the electrochromic element can be wiped clean of water droplets and general debris by means of an exterior mirror wiper blade as is commonly known in the exterior mirror assembly art. A bezel 61 surrounds mirror element 16.

Mirror system 10 further includes a control system, generally indicated at 26, having a first light sensor 28, a second light sensor 30 and a circuit 32 all mounted to a support 23, in order to produce a drive signal which is applied to electrochromic mirror element 16 in order to establish a partial reflectance level of the mirror. In the illustrated embodiment, circuit 32 is established on a circuit board which is mounted to support 23. Light sensors 28 and 30 are mounted to a lower portion 34 of support 23, although other physical configurations are possible, as will be explained in more detail below. Vehicle battery voltage, which is typically 12 volts, or ignition voltage, which is typically in the range of 9 volts to 16 volts with about 12.5 volts nominal, is introduced via an electrical connector 15. Preferably, electrical connector 15 supplies both circuit 32 and heater pad 20 with power. Alternative configurations are possible. Because a vehicle battery or ignition voltage line normally already are supplied to actuator 24, it is advantageous for connector 15 to conveniently connect to the actuator supply leads (not shown) and, thus, obviate the need to run an individual supply to circuit 32 and/or to heater pad 20. This ability to piggyback on existing actuator supply connectors and thus share a common power line makes the construction of the invention economically efficient and appealing to automakers.

Light sensor 28 is aimed along an axis A, which is generally horizontally oriented in the rearward direction with respect to movement of the vehicle. Light sensor 30 is aimed along another axis, designated axis B, which is radially offset from axis A by an angle alpha ($\alpha$) in the rearward direction with respect to movement of the vehicle. Axes A and B preferably lie on a vertical plane that is parallel the side of the vehicle, although it may be possible to orient axes A and B so that they are aimed somewhat inwardly or outwardly with respect to the vehicle. In the illustrated embodiment, angle alpha may be chosen from the range of between approximately 10 degrees and approximately 70 degrees. If angle alpha is significantly less than approximately 10 degrees, the demarcation between the light levels to which light sensors 28 and 30 are exposed may become largely indistinguishable. If angle alpha is significantly greater than approximately 70 degrees, the light level to which light sensor 30 is exposed may be partially occluded by casing 12 or by low angle surface reflections off mirror element 16. Additionally, light sensor 30 may respond inordinately to overhead light sources, such as streetlights if angle alpha ($\alpha$) is too large. Also, for deviations greater in angle than the critical angle of incidence to the substrate that the second light sensor is disposed behind (for example, the critical angle of a glass/air interface is about 41.5 degrees), its light collection efficiency is more limited. In the illustrated embodiment, light sensors 28 and 30 are cadmium sulfide photo-responsive resistors whose resistance is lowered as a non-linear function of increasing levels of light striking the sensor. However, any known photosensor with an electrical characteristic that varies as a function of received light could be utilized for light sensors 28, 30. For example, photo-diodes, photo-voltaic cells, or the equivalent thereof, may be utilized.

Figure 3:
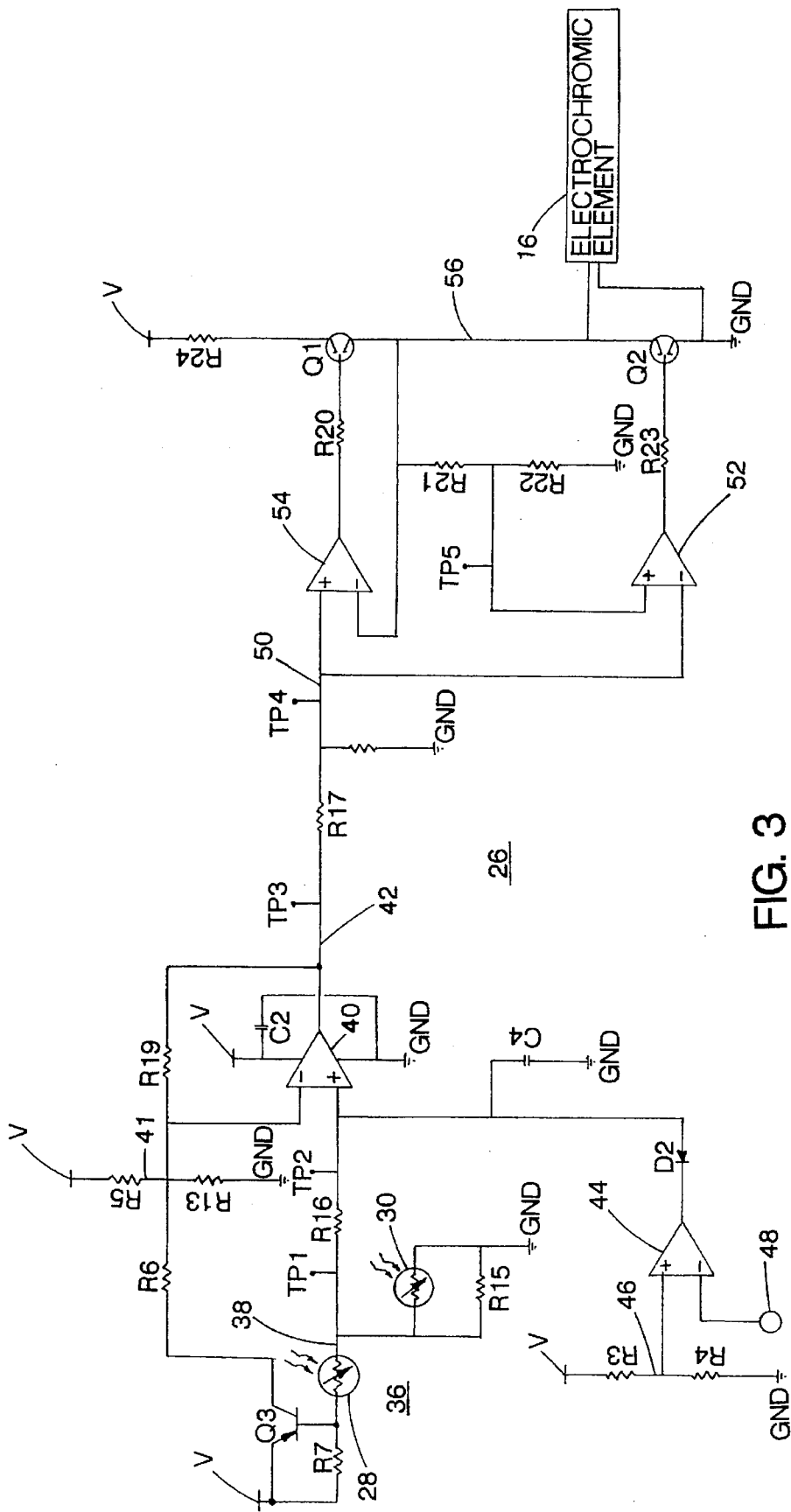
FIG. 3 is an electrical schematic diagram of a control system useful with the invention.

Light sensors 28 and 30 are electrically connected in circuit 32 in a voltage divider 36 (FIG. 3). Voltage divider 36 includes a series circuit between a voltage source V and ground extending through, in order, a resistor R7, light sensor 28, and a parallel connection between light sensor 30 and a resistor R15. The voltage signal at a junction, or node, 38 between light sensor 28 and the parallel combination of light sensor 30 and resistor R15, is supplied to the non-inverting input of an amplifier 40. The inverting input of amplifier 40 is connected to a junction 41 between a fixed voltage divider composed of a series connection of resistors R5 and R13 extending between voltage source V and ground. Junction 41 is additionally interconnected with an output 42 of amplifier 40 through a feedback resistor R19. Junction 41 is additionally interconnected through a resistor R6 and the emitter-collector junction of a transistor Q3 to voltage source V. The base of transistor Q3 is connected to the junction between resistor R7 and light sensor 28. The non-inverting input of amplifier 40 is also connected through a diode D2 to the output of a forced-bleach circuit composed of an amplifier 44. The non-inverting input of amplifier 44 is connected to a constant voltage junction 46, established by a voltage divider composed of a series connection of resistors R3 and R4 extending between voltage source V and ground. The inverting input of amplifier 44 is a coloration disable input 48, which may be connected with a switch actuated by the gearshift of the vehicle (not shown) in a manner that the input is placed in a high voltage state in response to the vehicle being placed in a reverse gear or may be connected with a switch actuated by an ON/OFF switch located within the vehicle cabin. For example, an ON/OFF switch located on an interior electrochromic mirror could optionally also serve as a coloration disable input for an exterior driver-side and/or passenger-side mirror of this invention. Likewise, any two or three mirrors in a multiple mirror set on a given vehicle could share, as input, a common reverse gearship selection signal.

Output 42 is reduced by a voltage divider composed of resistors R17 and R18 in order to produce a scaled voltage level at junction 50. The purpose of resistors R17 and R18 is in order to scale the voltage range of output 42 in order to match the operating range of the electrochromic element 16 being used. The scaled voltage provided at junction 50 is supplied to the inverting input of an amplifier 52 and to the non-inverting input of an amplifier 54. Because amplifiers 52 and 54 are not capable of supplying sufficient current to color and bleach electrochromic element 16, the output of amplifier 52 is connected with the base of a transistor Q2 through a resistor R23 and the output of amplifier 54 is connected with the base of a transistor Q1 through a resistor R20. The collector of transistor Q1 is connected through a resistor R24 with power source V. The emitter of transistor Q1 is connected with the collector of transistor Q2 at output 56, which supplies the coloration voltage to electrochromic element 16. The emitter of transistor Q2 is grounded. Output 56 is additionally connected with the inverting input of amplifier 54 and is connected, through a voltage divider composed of resistors R21 and R22, to the non-inverting input of amplifier 52.

The voltage at node 38 of voltage divider 36 is a function of the ratio of the light levels to which light sensors 28 and 30 are exposed. The voltage on node 38 will increase for increasing light levels to which light sensor 28 is exposed relative to the light levels to which sensor 30 is exposed and will decrease for increasing levels of light to which light sensor 30 is exposed relative to the level of light to which light sensor 28 is exposed. Transistor Q3 is driven into conductance during conditions indicative of daylight, namely when both sensors 28 and 30 are exposed to high lux levels. This decreases the voltage at junction 41, which forces bleaching of electrochromic element 16. Resistor R15 forces bleaching of electrochromic element 16 when both light sensors 28 and 30 are exposed to low lux levels.

The output 42 of amplifier 40 is generally equal to twice the voltage at node 38 minus the reference voltage at junction 41 provided that the output of amplifier 44 is at a high state. If coloration disable input 48 is at a low level, then the output of amplifier 44 will be at the positive rail, which is typically about 1.5 volts below amplifier supply voltage, and amplifier 40 will amplify the voltage at node 38 in the manner previously described. If, however, a positive voltage is applied to disable input 48 that is greater than the reference voltage at junction 46, the output of amplifier 44 will be driven to negative supply voltage and will clamp the non-inverting of amplifier 40 low. This will force the output 42 of amplifier 40 to a level that will force the signal on output 56 to a bleached condition.

When the signal on junction 50 increases above the voltage on output 56, amplifier 54 supplies a current to transistor Q1, which is driven into conduction, which causes the voltage on output 56 to rise to a level of the signal on junction 50. In contrast, when the level of the signal on junction 50 decreases below the voltage on output 56, amplifier 52 supplies a current to transistor Q2, which is placed into conduction, which lowers the voltage on output 56 until it equals the level of the signal at junction 50. A hysteresis, or dead band, is established by the voltage divider composed of resistors R21 and R22, in order to prevent amplifiers 52, 54 from concurrently driving their respective transistors Q1, Q2.

In the illustrated embodiment, light sensors 28 and 30 are positioned behind a region 60 of electrochromic element 16 that is unattenuated when the electrochromic mirror element 16 is caused to dim by electrical actuation (FIGS. 1 and 2). It is comprehended by the invention that the light to which light sensors 28 and/or 30 are exposed may be attenuated by the variable light transmission layer of electrochromic mirror element 16 which, for example, may be an electrochemichromic solution or may be a solid-state layer, such as a layer comprising a tungsten oxide, or other metal oxide, electrochromic thin film. This is facilitated by the operation of circuit 32, which develops a drive signal at output 56 that is a function of the ratio of the light levels to which light sensors 28 and 30 are exposed. This reduces the effect on the sensors of the attenuation of light by either the variable light transmission layer of mirror element 16 or of debris on the exterior surface of the mirror element. Alternatively, a region of the variable light transmission layer of electrochromic element 16 may be removed, or rendered inoperable, at region 60 by techniques known in the art. In order to cosmetically "hide" region 60, a semitransparent layer may be deposited over the region 60. The semitransparent layer may be one of a paint, a film, a coating, or a polymeric reflective material (PRM). PRM is a spectrally selective, substantially reflecting (greater than about 50 percent preferred), and significantly transparent polymer reflector material as disclosed in T. Alfrey, Jr. et al., "Physical Optics of Iridescent Multilayered Plastic Films," *Polym. Eng'g. & Sci.*, 9(6), 400–404 (1969); W. Schrenk et al., "Coextruded Elastomeric Optical Interference Film," *ANTEC '88*, 1703–1707 (1988); and U.S. Pat. No. 3,711,176 issued to Alfrey, Jr.; U.S. Pat. No. 3,557,265 issued to Chisolm; and U.S. Pat. No. 3,565,985 issued to Schrenk. PRM is commercially available from Dow Chemical Co., Midland, Mich. Such layer desirably has a light transmission of at least about 25 percent and more preferably above about 50 percent. Alternatively, a dichroic filter consisting of a thin film stack may be used as a semi-transparent layer that is both significantly transmitting and is substantially reflecting. Furthermore, since many photosensors have a high sensitivity in the near and far infrared spectral regions, and since headlights emit appreciably in these spectral regions, it is useful, particularly for the first sensor, to have a high transmittance in the near and far infrared spectral regions for the semi-transparent layer. Alternatively, light sensors 28 and 30 could be positioned on electrochromic mirror assembly 14 where the light to which the light sensors are exposed does not travel through the electrochromic mirror element. For example, light sensors could be positioned on the rearward facing potion of a bezel 61 extending around the mirror. Positioning the light sensors behind the electrochromic element is preferred because, whenever the outer surface of element 16 is cleaned by the vehicle operator, the debris will be removed from sensing region 60 of the mirror assembly through which light comes in contact with light sensors 28 and 30. Also, the semitransparent layer may be a non-reflector, such as a dark paint, such as of black acrylic paint, or may be a semitransparent but substantially reflective coating of a thin metal film, such as of aluminum, silver, chromium, titanium, nickel-based alloy, or similar metal and of a physical thickness in the range of about 5 nm to about 40 nm.

In an alternative embodiment, an automatic rearview mirror system 10' includes an electrochromic mirror assembly 14' including electrochromic mirror element 16' surrounded by a bezel 61' positioned within a casing 12' (FIG. 4). Light sensors 28' and 30', which are aimed generally in a direction rearwardly of the vehicle, are positioned within a common housing 62 which may be made of a resinous plastic or other suitable material. Light sensor 28', which is aimed along a generally horizontal axis, is positioned within a light conduit defined by a cylindrical wall 64 defined in housing 62. Light sensor 30', which is aimed along an axis that deviates from the horizontal axis, is mounted within a light conduit in housing 62 defined by a cylindrical wall 66. The conduit defined by wall 64 is elongated along a generally horizonal axis A' and the conduit defined by wall 66 is elongated along axis B' that is at an angle alpha' ($\alpha'$) with respect to axis A'. In the illustrated embodiment, angle alpha' ($\alpha'$) is selected from a range extending from approximately 10 degrees to approximately 70 degrees. Wall 64 preferably has surface characteristics that tend to absorb light. This causes sensor 28' to be more uni-directional because light contacting wall 64 will tend to be absorbed. Therefore, light reaching sensor 28' will be mostly directional along axis A'. Wall 66 preferably has light reflecting characteristics, which may be specular, diffuse, or both. Therefore, any light entering the cavity defined by wall 66 will tend to reach sensor 30'. This causes sensor 30' to be more omni-directional because light entering the cavity defined by wall 66 will tend to be received by sensor 30' even if the light is not directional along axis B'. The conduits defined by walls 64 and 66 may intersect, as illustrated in FIG. 4, in order to provide for compact spacing of sensors 28' and 30'. However, the conduits may be laid out so that they do not intersect. Housing 62 may be adhesively affixed to the forward surface of electrochromic mirror assembly 14' or may be integrally formed with encasement 22'. The cavities defined by walls 64 and 66 may be apertured, filtered, lensed, or irised in order to affect the characteristics of the light to which sensors 28' and 30' are exposed to suit a particular application.

Figure 5B:
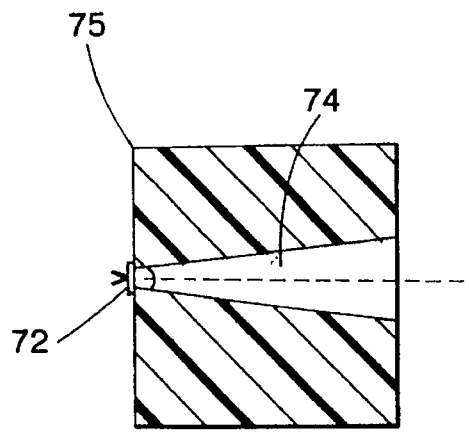
FIG. 5B is a sectional view taken along the lines 5B—5B in FIG. 5A.
Figure 5A:
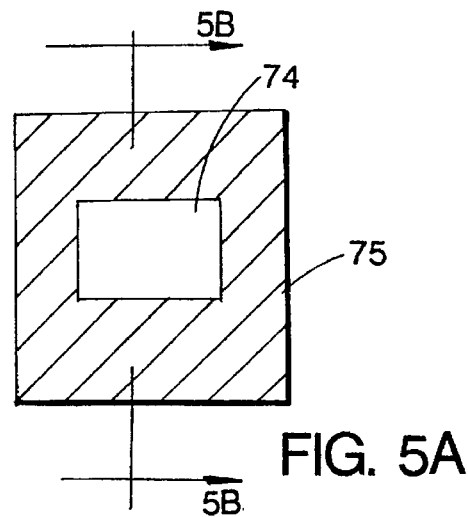
FIG. 5A is a rear elevational view of a second alternative light sensor arrangement, according to the invention.
Figure 5D:
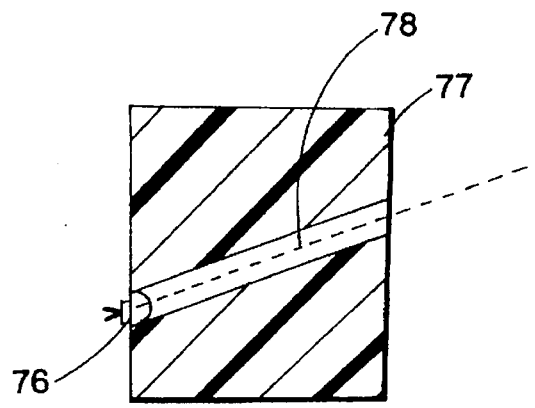
FIG. 5D is a sectional view taken along the lines 5D—5D in FIG. 5C.
Figure 5C:
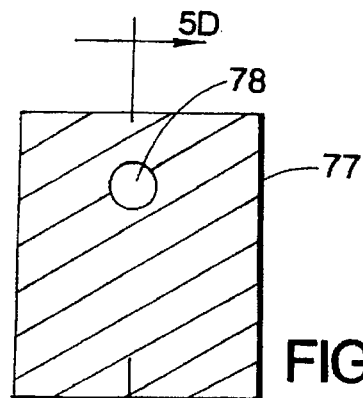
FIG. 5C is a rear elevational view of a third alternative light sensor arrangement, according to the invention.
Figure 5F:
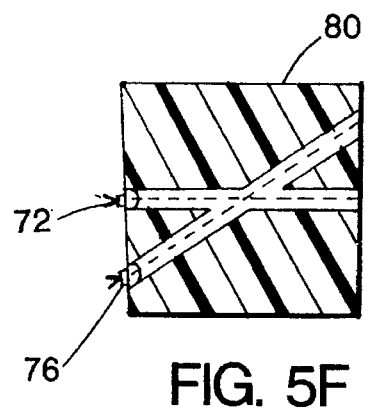
FIG. 5F is a sectional view taken along the lines 5F—5F in FIG. 5E.
Figure 5E:
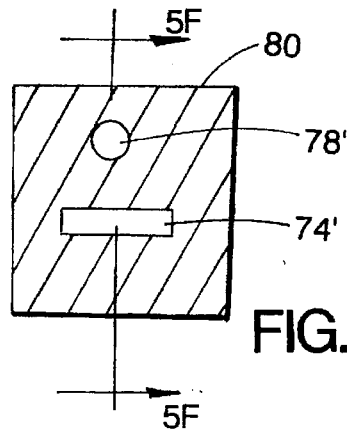
FIG. 5E is a rear elevational view of a fourth alternative light sensor arrangement, according to the invention.

As illustrated in FIGS. 5A–5F, various conduiting means can be used to appropriately aim and aperture the sensors of this invention. In FIGS. 5A and 5B, a first horizontally aimed light sensor 72 is conveniently plugged into one end of a frustum-shaped conduit 74 in a common housing such as mounting block 75. Conduit 74 flares outward and ends, as shown in FIG. 5A, in a generally rectangular light receiving aperture. By contrast, as illustrated in FIG. 5C, a second, non-horizontally aimed sensor 76 also conveniently plugs into one end of a generally circular cross-sectional conduit 78 formed in a mounting block 77. Conduit 76 ends, as shown in FIG. 5C, in a generally circular light receiving aperture. As shown in FIGS. 5E and 5F, both sensors 72 and 76 can be mounted into the same mounting block 80 with the body of the block isolating horizontally oriented conduit 74' from non-horizontally oriented conduit 78' so that the demarcation between the light sensed by the first sensor, namely the glaring light from rear approaching vehicles, and the light sensed by the second sensor, is enhanced.

Furthermore, although the aiming direction of the second sensor 76 in FIGS. 5D and 5F is upward, it may also be chosen to be downward such that, in a driving situation, the second sensor is aimed at the road, rather than skyward as it is illustrated in FIGS. 5D and 5F. The preference of aiming upward or downward for the second sensor can be determined by routine experiment on a given vehicle.

The novel mounting for the two sensors, such as is schematically illustrated in FIGS. 5A–5F, has many advantages and lends itself to economical manufacturing and high performance in automatic mirror operation. The mounting, including the conduits, can be molded or machined, or both, out of a polymer material, such as polyvinyl chloride, acrylic, acrylate, polycarbonate, polystyrene, nylon, ABS, polyurethane, epoxy, polyethylene, polypropylene, polyolefin, or the like, and can be formed by a variety of molding techniques, including injection molding and casting. Preferably, the mounting block is formed of a material that is light absorbing, such as a polymer resin with colorant or pigment, such as carbon black or any other known colorant in the polymer resin art, so that individual conduits can be formed therein that are light isolated, one from the other. The face of the mounting block may be attached to a surface of the electrochromic mirror element, such as the inward facing surface of the outermost glass substrate, using an adhesive and preferably utilizing an index matching adhesive with a refractive index of about 1.4 to 1.6 and preferably 1.45 to 1.55. Such refractive index can be achieved using acrylic, acrylate, urethane, and epoxy based adhesives. The mounting block can be dark colored, such as when formed from a black, dark blue, dark grey, or the like color material. Also, it may be color-matched to any seal or bezel in the mirror assembly using the concepts as taught in U.S. Pat. No. 5,066,112 issued to Lynam et al. entitled PERIMETER COATED ELECTRO-OPTIC MIRROR, the disclosure of which is hereby incorporated by reference.

Also, although illustrated in FIGS. 5A–5F as channels in a solid block, light conduits 74, 78, 74', 78' between the external aperture and the photosensor can be made by other means, such as by fibre-optic linkage, such as using fibre-optic cables or bundles, by light pipes, or by individual light conduits such as by pipes, tubes, baffles, mazes, or the like.

A specific embodiment of a rearview mirror system 10" utilizing an electrochromic variable transmission element is illustrated in FIGS. 6 and 7. Glass substrates 100, 101 are coated on their respective inwardly facing surfaces 100A, 101A with a transparent conductor coating such as of indium tin oxide, doped tin oxide, or their like. An interpane cavity is formed between these two spaced apart substrates by means of seal 140, which is preferably an epoxy, and with the interpane spacing preferably being about 50–150 microns. Such seal may be established by silkscreening, or by use of thermoplastics and die-cuts, such as disclosed in U.S. Pat. No. 5,233,861 issued to Doman et al. entitled METHODS FOR SEALING ELECTROCHROMIC DEVICES AND DEVICES MANUFACTURED THEREBY, or by dispensing an uncured or only partially cured adhesive, such as an epoxy, using a precision dispense valve and valve controller, such as are available from EFD Incorporated, East Providence, R.I., under computer numerical control (CNC) around the periphery of a glass substrate, lamination of a second substrate thereto, and thereafter passage of the laminate sandwich into an oven or through a conveyorized lehr to achieve a substantial cure of the precisely dispensed bead of adhesive to establish the seal about the perimeter. The interpane spacing is filled with an electrochemichromic solution 130, such as is disclosed in the Varaprasad et al. '455 patent previously referred to defining a variable light transmission layer. Alternatively, a solid-state electrochromic medium may be used such as are described in the Varaprasad et al. '521 application previously referred to. Rear substrate 101 is coated on its outer surface 120 with a mirror reflector, such as silver or aluminum. A portion of front, or first, glass substrate 100, in the form of a lobe 600, extends beyond the lower rim of the rear, or second, substrate 101 (FIG. 6). Mounted behind this is the horizontally aimed photosensor 128 and the upwardly aimed photosensor 130. Viewing apertures are created on the inward surface of glass substrate 100 by applying substantially opaque blackout coating segments 150 A–C. The photosensors so mounted are disposed behind and protected against the outdoor elements, such as rain, road spray, hail, and the like, and from physical abuse, by the front glass substrate 100 and are assisted in their demarcation of glaring light from other light by means of the apertures established by coating segments 150 A–C.

The electrochromically active portion 610 of mirror system 10", typically of area greater than about 100 $cm^2$ and less than about 500 $cm^2$ for exterior mirror systems suitable to use on automobiles, minivans, light trucks, small vans, and sport utility vehicles, is enclosed within the boundary defined by seal 140. In the lower right-most corner that would be adjacent the car body when mounted on a vehicle, a region 600, defined as being outside the electrochromic region but behind the extended lobe of glass substrate 100, which, being the first substrate, is exposed to and contacting the outdoor elements when mounted on a vehicle, has therebehind the two rearwardly aimed photosensors 128 and 130. Furthermore, heating element 135, mounted to the rear surface of rear substrate 101, when powered, acts to remove dew or ice from the front-most surface of front, or first, substrate 100. Also, an enclosure 126 is provided for encasing photosensors 128 and 130.

Although the invention has special advantages when utilized as an exterior mirror of a vehicle, it may additionally be useful as an interior rearview mirror positioned within the passenger compartment of the vehicle. Furthermore, a plurality of mirror systems, according to this invention, can be used on the one vehicle to form an independent dimming, multiple automatic mirror system. For example, an interior electrochromic automatic mirror system of this invention may be mounted in the interior cabin of a vehicle that is also equipped with an exterior electrochromic mirror system of this invention on its driver-side and/or passenger-side. Such exterior mirror may be any of a flat, convex, or multi-radius exterior mirror. The individual electrochromic automatic mirrors in this multiple automatic mirror set will respond independently to glare detected from a vehicle approaching from a rear lane or a left- or right-side lane. This contrasts to the slaved control common in prior art commercial multilple mirror configurations where glare detected by the single automatic interior mirror causes all two or three mirrors in the multiple mirror set to dim simultaneously regardless of whether glaring light is actually present in any side lane.

The invention may be used with an open-loop control of the type described herein or with a closed-loop control of the type disclosed in U.S. Pat. No. 4,917,477 issued to Jon H. Bechtel et al. for an AUTOMATIC REARVIEW MIRROR SYSTEM FOR AUTOMOTIVE VEHICLES. Although control circuit 32 is illustrated with a disable input 48 that responds to the gearshift of the vehicle being placed in a reverse gear, such disable input is optional. The control may additionally include an input for an ON/OFF switch within the passenger compartment to allow the user to place the mirror element in a fully bleached condition or a sensitivity control within the passenger compartment in order to allow the user to select the sensitivity of the control to light conditions. Although the light sensors are illustrated as grouped behind a common portion of the mirror element, it would also be possible to separate the light sensors and position them at different locations within, and aiming rearwardly from, the automatic rearview mirror assembly.

The present invention provides a module that may be positioned within an exterior mirror housing and is capable of providing all of the control functions associated with an automatic rearview mirror system. The encasement for the module can be fabricated from a pre-molded form, such as a resinous molding, such as, for example, of a melt-processable polymer such as polypropylene, polyethylene, or the like, that, in turn, is adhered to the variable reflectance device or it may be formed by potting the various components of the module, such as the variable reflectance element, mounting means for the photosensors, internal electrical interconnects, heater pad, control circuit, and the like in a polymer resin, such as is used in potting integrated circuits and the like. Suitable potting resins include silicones, epoxies, acrylics, acrylates, urethanes, and their like. A resinous molding can be combined with a potting material or sealant, preferably one that is room temperature or low temperature cured, with less than about 100° C. preferred, to form a hermetic, or near-hermetic, encasement for the module of this invention, such that it can withstand not only outdoor elements such as rain, hail, road splash, and the like but also be undamaged by repeated passage through carwashes. The various components of the module of this assembly, including any mounting block, may be formed and/or assembled in an integral molding process, such as with those processes described in U.S. Pat. Nos. 4,139,234 issued to Morgan and 4,561,625 issued to Weaver, the disclosures of which are hereby incorporated herein by reference, each of which describe suitable molding processes in the context of module window encapsulation. An added-value automatic electrochromic mirror module of this invention, potentially also including the actuators which allow adjustment and selection of reflector field of view when mounted within the outside mirror housings attached to the driver-side and passenger-side of a vehicle, may be pre-assembled and supplied to outside vehicular mirror housing manufacturers to facilitate ease and economy of manufacturing. For example, a module of the invention, including an electrochromic mirror element, two rearward facing sensors, and a control circuit could be supplied to the manufacturer of exterior mirror housings for installation therein and for mounting on, for example, Class 8 heavy trucks.

Using the concepts of this invention, a module comprising the electrochromic element, the two sensors and associated automatic dimming control circuitry, and optionally a heater pad, may be shipped sealed and protected against the outdoor environment within a suitable encasement. This module can simply be adhered to the backing plate of an exterior mirror housing assembly in place of the conventional chromed glass mirror shape now typically used. Furthermore, since a 12-volt supply is routinely supplied to the mirror actuator that aligns the mirror reflector to suit drivers' needs, the electrochromic module of this invention can conveniently attach in piggyback fashion, such as by crimping in a manner that pierces electrical insulation to access the encased metal conducting wire, to the existing 12-volt lead that supplies the actuator. Also, the aiming of the field of view of the two light sensors of this invention in a direction rearwardly of the vehicle and with the first light sensor generally horizontally aimed and with the second light sensor generally aimed non-horizontally can be achieved in a variety of ways. For example, the photosensitive surface of the light sensor can be physically aimed along the desired rearward axis so that its field of view coincides therewith. Alternatively, the photosensor surface of the light sensor can face other than along the desired rearward axis, and light conduiting and/or reflecting means, such as light pipes, reflectors, fibre-optic cables and bundles, lenses, and their like, can be used to cause the field of view of the light sensor to be aimed along the desired rearward axis.

Vehicles equipped with an exterior automatic electrochromic mirror, according to this invention, have been successfully operated in a variety of daytime and nighttime driving situations.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An automatic rearview mirror system for a vehicle, comprising:

a variable reflectance device having a reflectance surface which reflects light incident said surface from a direction rearward of the vehicle, said variable reflectance device having a variable light transmission layer which responds to a drive signal from a control by dimming to a partial light transmission condition;

said control including first and second light sensors and a circuit which is responsive to electrical characteristics of said light sensors to produce said drive signal as a function of levels of light to which said light sensors are exposed; and said first and second light sensors aimed generally in a direction rearwardly of the vehicle, said first light sensor aimed along a generally horizontal axis and said second light sensor aimed along another axis that deviates from said horizontal axis, wherein said another axis deviates from said horizontal axis by at least approximately 10 degrees and not more than approximately 70 degrees.

2. The rearview mirror system in claim 1 wherein said another axis deviates in a vertical plane upwardly from said horizontal axis.

3. The rearview mirror system in claim 1 wherein said variable reflectance device includes a variable light transmission layer and wherein at least one of said first and second light sensors are aimed through said variable light transmission layer.

4. The rearview mirror system in claim 1 wherein said first and second light sensors are mounted in a common housing.

5. The rearview mirror system of claim 4 wherein said housing is a mounting block.

6. An automatic rearview mirror system for a vehicle, comprising:

a variable reflectance device having a reflectance surface which reflects light incident said surface from a direction rearward of the vehicle, said variable reflectance device having a variable light transmission layer which responds to a drive signal from a control by dimming to a partial light transmission condition;

said control including first and second light sensors and a circuit which is responsive to electrical characteristics of said light sensors to produce said drive signal as a function of levels of light to which said light sensors are exposed; and said first and second light sensors aimed generally in a direction rearwardly of the vehicle, said first light sensor aimed along a generally horizontal axis and said second light sensor aimed along another axis that deviates from said horizontal axis;

wherein said rearview mirror system is exposed to outdoor elements, said outdoor elements comprising at least one of rain, road splash and hail, and wherein said variable reflectance device includes a variable reflectance element having at least a first glass substrate, said first glass substrate being exposed to and contacting said outdoor elements, wherein at least one of said first and second light sensors is disposed behind, and protected from said outdoor elements by, said first glass substrate.

7. The rearview mirror system of claim 6 wherein said variable reflectance element further comprises a second glass substrate, said second glass substrate being behind, and spaced apart from, said first substrate.

8. The rearview mirror system of claim 6 wherein said second light sensor is disposed behind, and protected from, said outdoor elements by said first glass substrate.

9. The rearview mirror system in claim 6 wherein said first and second light sensors are aimed through a region of said variable reflectance device that does not include a portion of said variable light transmission layer.

10. The rearview mirror system in claim 9 including a semitransparent layer over said region of said variable reflectance device.

11. The rearview mirror system in claim 10 wherein said semitransparent layer includes one of a paint, a film, a coating, a dichroic filter and a PRM.

12. The rearview mirror system in claim 6 including a bezel surrounding said variable reflectance device.

13. The rearview mirror system in claim 6 wherein said variable reflectance device comprises an electrochromic mirror element.

14. The rearview mirror system in claim 13 wherein said electrochromic mirror element is of the electrochemichromic type.

15. The rearview mirror system in claim 13 wherein said electrochromic mirror element is of the solid-state type.

16. The rearview mirror system of claim 13 wherein said vehicle is one of an automobile, a minivan, a light truck, a small van, and a sport utility vehicle.

17. The rearview mirror system of claim 16 wherein said variable reflectance element has an electrochromically active region of area greater than about 100 $cm^2$ and less than about 500 $cm^2$.

18. The rearview mirror system in claim 6 wherein said variable reflectance device is positioned exterior a passenger compartment of the vehicle.

19. The rearview mirror system in claim 18 including a heater element juxtaposed with said reflectance surface in order to remove frost and dew from said variable reflectance device, wherein said heater element and said control are supplied with vehicle battery voltage or ignition voltage.

20. The rearview mirror system in claim 6 wherein said control includes an inhibit input that causes said circuit to supply a bleach voltage to said variable light transmission layer in order to force said variable reflectance device to a high reflectance level.

21. The rearview mirror system in claim 20 wherein said inhibit input is responsive to the gearshift of the vehicle being in a reverse gear.

22. The rearview mirror system in claim 6 wherein said circuit is responsive to a ratio of the light levels to which said first and second light sensors are exposed.

23. The rearview mirror system in claim 22 wherein said first and second light sensors are electrically connected in said circuit in a voltage divider, said drive signal being derived from an output of said voltage divider.

24. An automatic rearview mirror system for a vehicle, comprising:

a variable reflectance device having a reflectance surface which reflects light incident said surface from a direction rearward of the vehicle, said variable reflectance device having a variable light transmission layer which responds to a drive signal from a control by dimming to a partial light transmission condition;

said control including first and second light sensors and a circuit which is responsive to electrical characteristics of said light sensors to produce said drive signal as a function of levels of light to which said light sensors are exposed; and said first and second light sensors aimed generally in a direction rearwardly of the vehicle, said first light sensor aimed along a generally horizontal axis and said second light sensor aimed along another axis that deviates from said horizontal axis;

wherein said first and second light sensors are mounted in a common housing, wherein said housing is a mounting block, wherein said mounting block includes a first surface defining a first light conduit and a second surface defining a second light conduit, said first light sensor positioned in said first light conduit and said second light sensor positioned in said second light conduit.

25. The rearview mirror system in claim 24 wherein said first surface defining said first light conduit has light absorbing characteristics.

26. The rearview mirror system in claim 24 wherein said second surface defining said second light conduit has light gathering characteristics.

27. The rearview mirror system in claim 24 wherein said first and second light conduits intersect.

28. The rearview mirror system in claim 24 wherein said first and second light conduits are isolated from each other.

29. An automatic rearview mirror system for a vehicle, comprising:

an electrochromic mirror element having a reflectance surface which reflects light incident said surface from a direction rearward of the vehicle, said mirror element including at least a first glass substrate exposed to and contacting outdoor elements, said outdoor elements comprising at least one of rain, road splash and hail, and a variable light transmission layer, said variable light transmission layer being responsive to a drive signal from a control by dimming to a partial light transmission condition;

said control including first and second light sensors and a circuit which is responsive to electrical characteristics of said light sensors to produce said drive signal as a function of levels of light to which said light sensors are exposed;

said first and second light sensors aimed generally in a direction rearwardly of the vehicle, said first light sensor aimed along a generally horizontal axis and said second light sensor aimed along another axis that deviates from said horizontal axis; and said first and second light sensors disposed behind said first glass substrate and thereby protected by said first glass substrate from said outdoor elements.

30. The rearview mirror system in claim 29 wherein said another axis deviates from said horizontal axis by at least approximately 10 degrees and not more than approximately 70 degrees.

31. The rearview mirror system in claim 29 wherein said another axis deviates downwardly from said horizontal axis.

32. The rearview mirror system in claim 29 wherein said another axis deviates upwardly from said horizontal axis.

33. The rearview mirror system in claim 29 wherein said mirror element includes an electrochromic variable light transmission layer and wherein at least one of said first and second light sensors are aimed through said variable light transmission layer.

34. The rearview mirror system in claim 29 wherein said mirror element includes an electrochromic variable light transmission layer and wherein said first and second light sensors are aimed through a region of said mirror element that does not include a portion of said variable light transmission layer.

35. The rearview mirror system in claim 29 including a semitransparent layer over said region of said mirror element.

36. The rearview mirror system in claim 35 wherein said semitransparent layer includes one of a paint, a film, a coating, a dichroic filter, and a PRM.

37. The rearview mirror system in claim 29 wherein said first and second light sensors are mounted in a common housing.

38. The rearview mirror system in claim 37 wherein said housing is a mounting block.

39. The rearview mirror system in claim 38 wherein said common housing includes a first surface defining a first light conduit and a second surface defining a second light conduit, said first light sensor positioned in said first light conduit and said second light sensor positioned in said second light conduit.

40. The rearview mirror system in claim 39 wherein said first surface defining said first light conduit has light absorbing characteristics.

41. The rearview mirror system in claim 39 wherein said second surface defining said second light conduit has light gathering characteristics.

42. The rearview mirror system in claim 39 wherein said first and second light conduits intersect.

43. The rearview mirror system in claim 39 wherein said first and second light conduits are isolated from each other.

44. The rearview mirror system in claim 29 including a bezel surrounding said mirror element.

45. The rearview mirror system in claim 29 wherein said mirror element is positioned exterior a passenger compartment of the vehicle.

46. The rearview mirror system in claim 45 including a heater element juxtaposed with said reflectance surface in order to remove frost and dew from said reflectance surface, wherein said heater element and said control are supplied with vehicle battery voltage or ignition voltage.

47. The rearview mirror system in claim 29 wherein said control includes an inhibit input that causes said circuit to supply a bleach voltage to said mirror element in order to force said mirror element to a non-dimmed condition.

48. The rearview mirror system in claim 47 wherein said inhibit input is responsive to the gearshift of the vehicle being in a reverse gear.

49. The rearview mirror system in claim 29 wherein said circuit is responsive to a ratio of the light levels to which said first and second light sensors are exposed.

50. The rearview mirror system in claim 49 wherein said first and second light sensors are electrically serially connected in a voltage divider, said drive signal being derived from an output of said voltage divider.

51. The rearview mirror system in claim 29 wherein said electrochromic mirror element is of the electrochemichromic type.

52. The rearview mirror system in claim 29 wherein said electrochromic mirror element is of the solid-state type.

53. The rearview mirror system of claim 29 wherein said vehicle is one of an automobile, a minivan, a light truck, a small van, and a sport utility vehicle.

54. The rearview mirror system of claim 53 wherein said electrochromic mirror element has an active region of area greater than about 100 cm$^2$ and less than about 500 cm$^2$.

55. A method of establishing the reflectance level of a vehicular rearview mirror, said mirror including an electrochromic mirror element having a variable light transmission layer that responds to a drive signal by dimming to a partial light transmission level, including:

providing a first light sensor that is aimed in a direction rearwardly of the vehicle along a generally horizontal axis and a second light sensor that is aimed in a direction rearwardly of the vehicle along another axis that deviates from said horizontal axis by at least approximately 10 degrees and not more than approximately 70 degrees; and establishing a value of said drive signal as a function of the light levels to which said first and second light sensors are exposed.

56. The method of claim 55 wherein said providing includes positioning said first and second light sensors behind the mirror element and aimed generally in a direction rearwardly of the vehicle through said mirror element.

57. The method of claim 56 including aiming at least one of said first and second light sensors through a variable light transmission layer of said mirror element.

58. The method of claim 56 including aiming said first and second light sensors through a portion of said mirror element that does not include a variable light transmission layer.

59. The method of claim 55 wherein said providing includes surrounding each of said light sensors with a surface defining a light conduit.

60. The method of claim 59 wherein said surface surrounding said first light sensor has light absorbing characteristics.

61. The method of claim 59 wherein said surface surrounding said second light sensor has light gathering characteristics.

62. The method of claim 55 wherein said establishing a value of a drive signal includes responding to a ratio of light levels to which said first and second light sensors are exposed.

63. A module for use within an exterior mirror housing on a vehicle comprising:

a variable reflectance element; and a control circuit for controlling the reflectivity value of said variable reflectance element;

wherein said control circuit includes a first photosensor and a second photosensor, said first and second photosensors aimed generally in a direction rearward of the vehicle and wherein said control circuit establishes said reflectivity value as a function of light levels to which said first and second photosensors are exposed;

wherein said variable reflectance element is an electrochromic mirror element having an electrochromically dimmable region, wherein said module further includes an encasement to protect said control circuit and said reflectance element from outdoor elements, said outdoor elements comprising at least one of rain, road splash and hail, wherein said variable reflectance element includes at least a first glass substrate, said first glass substrate being exposed to, and contacting, said outdoor elements, wherein at least one of said first and second photosensors is disposed behind, and protected from said outdoor elements by, said first glass substrate.

64. The module of claim 63 wherein said module further includes a heater element for removing dew or ice from said first substrate of said reflectance element.

65. The module of claim 63 wherein said variable reflectance element further includes a second glass substrate, said glass substrate being behind, and spaced apart from, said first substrate.

66. The module of claim 63 further including an electrically operated actuator for aligning said module with respect to a rearward field of view.

67. The module of claim 66 wherein said actuator is electrically powered by one of an ignition voltage, a vehicle battery voltage, and a 12-volt supply.

68. The module of claim 67 wherein said control circuit shares a common power line with said actuator.

69. The module of claim 63 wherein said second light photosensor is disposed behind, and protected from, said outdoor elements by said first glass substrate.

70. The module of claim 69 wherein said second photosensor is aimed upward with respect to the aiming direction of said first photosensor.

71. The module of claim 69 wherein said second photosensor is aimed downward with respect to the aiming direction of said first photosensor.

72. The module of claim 69 wherein said second photosensor is aimed in a direction that deviates by more than approximately 10 degrees from the direction of aim of said first photosensor.

73. The module of claim 72 wherein said second photosensor is aimed in a direction that deviates by less than approximately 70 degrees from the direction of aim of said first photosensor.

74. The module of claim 63 wherein at least one of said first and second photosensors are mounted to a mounting block including means defining at least one light conduit.

75. The module of claim 63 wherein both said first and said second photosensors are mounted to a mounting block including means defining two light conduits.

76. The module of claim 63 wherein said control circuit is a closed-loop control comprising said first photosensor disposed behind, and attenuated by activation of, the electrochromically dimmable region of said mirror element.

77. The module of claim 76 wherein said second photosensor is disposed behind a portion of said first glass substrate at a location unattenuated by activation of the electrochromically dimmable region of said mirror element.

78. The module of claim 63 wherein said control circuit is an open-loop control comprising said first photosensor and said second photosensor disposed behind said first glass substrate at a location unattenuated by activation of the electrochromically dimmable region of said mirror element.

79. The module of claim 63 wherein said electrochromic mirror element is of the electrochemichromic type.

80. The module of claim 63 wherein said electrochromic mirror element is of the solid-state type.

81. The module, of claim 63 wherein said vehicle is one of an automobile, a minivan, a light truck, a small van, and a sport utility vehicle.

82. The module of claim 81 wherein said variable reflectance element has an electrochromically active region of area greater than about 100 $cm^2$ and less than about 500 $cm^2$.

* * * * *

UNITED STATES PATENT AND TRADEMARK OFFICE
CERTIFICATE OF CORRECTION

PATENT NO. : 5,659,423
DATED : August 19, 1997
INVENTOR(S) : Kenneth L. Schierbeek, Kenneth Schofield and Niall R. Lynam It is certified that error appears in the above-identified patent and that said Letters Patent is hereby corrected as shown below:

Column 8, line 26:
"potion" should be --portion--.

Column 10, line 16:
"Doman" should be --Dornan--.

Column 10, line 30:
After "to", insert --,--.

Column 11, line 16:
"multilple" should be --multiple--.

Column 18, claim 81, line 45:
After "module", delete ",".

Signed and Sealed this

Twenty-ninth Day of February, 2000

Attest:

Q. TODD DICKINSON

Attesting Officer

Commissioner of Patents and Trademarks